United States Patent
Guo

(10) Patent No.: US 9,413,498 B2
(45) Date of Patent: Aug. 9, 2016

(54) METHOD AND APPARATUS FOR HANDLING BUFFER STATUS REPORTING IN A WIRELESS COMMUNICATION SYSTEM

(75) Inventor: Yu-Hsuan Guo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 310 days.

(21) Appl. No.: 13/100,846

(22) Filed: May 4, 2011

(65) Prior Publication Data

US 2011/0292873 A1    Dec. 1, 2011

Related U.S. Application Data

(60) Provisional application No. 61/348,247, filed on May 26, 2010.

(51) Int. Cl.

| H04W 4/00 | (2009.01) |
|---|---|
| H04L 5/00 | (2006.01) |
| H04W 28/14 | (2009.01) |
| H04W 72/00 | (2009.01) |

(52) U.S. Cl.
CPC ............. *H04L 5/0007* (2013.01); *H04L 5/001* (2013.01); *H04L 5/0098* (2013.01); *H04W 28/14* (2013.01); *H04W 72/00* (2013.01)

(58) Field of Classification Search
USPC .......................... 370/252, 328, 338, 401, 465
See application file for complete search history.

(56) References Cited

U.S. PATENT DOCUMENTS

| 8,331,308 B1* | 12/2012 | Au et al. ........................ 370/330 |
| 2009/0149189 A1* | 6/2009 | Sammour et al. ............. 455/450 |
| 2010/0246705 A1* | 9/2010 | Shin et al. ...................... 375/267 |
| 2011/0159867 A1* | 6/2011 | Kuo ............................. 455/422.1 |
| 2011/0222457 A1* | 9/2011 | Lee et al. ....................... 370/312 |
| 2011/0242972 A1* | 10/2011 | Sebire et al. .................. 370/229 |
| 2011/0243106 A1* | 10/2011 | Hsu et al. ...................... 370/336 |

(Continued)

FOREIGN PATENT DOCUMENTS

| JP | 2012528495 A | 11/2012 |
| TW | 200718254 A | 5/2007 |
| TW | 200931876 A | 7/2009 |

OTHER PUBLICATIONS

Office Action on corresponding foreign application (JP 2011-117021) dated Feb. 12, 2013.

(Continued)

*Primary Examiner* — Ricky Ngo
*Assistant Examiner* — Christine Ng
(74) *Attorney, Agent, or Firm* — Blue Capital Law Firm, P.C.

(57) ABSTRACT

A method and apparatus for handling buffer status reporting in a wireless communication system includes providing a first buffer size level table having a first maximum buffer size value, and providing a second buffer size level table having a second maximum buffer size value greater than the first maximum buffer size value. The method includes using the second buffer size level table when carrier aggregation (CA) is configured with more than one UL carrier component (CC) or when more than one UL CC is activated. To indicate whether to use the second buffer size level table or the first buffer size level table, an indication can be used in one of a Radio Resource Control (RRC) message, a Medium Access Control (MAC) Control Element or a corresponding subheader of the MAC Control Element.

22 Claims, 7 Drawing Sheets

(56) References Cited

U.S. PATENT DOCUMENTS

| | | | | |
|---|---|---|---|---|
| 2011/0267955 A1* | 11/2011 | Dalsgaard | | 370/241 |
| 2011/0292854 A1* | 12/2011 | Terry et al. | | 370/311 |
| 2012/0057529 A1* | 3/2012 | Seo et al. | | 370/328 |
| 2012/0113909 A1* | 5/2012 | Jen | | 370/329 |

OTHER PUBLICATIONS

3GPP TSG-RAN WG2 Meeting #68, Neju, Korea, Nov. 9-13, 2009.
3GPP TSG-RAN WG2 Meeting #70, Montreal, Canada, May 10-14, 2010.
Search Report on corresponding EP Patent Application No. 11003781.9 dated Jan. 9, 2012.
Johansson, K.; Bergman, J.; Gerstenberger, D.; Bolmgern, M.; Wallen, A., "Multi-Carrier HSPA Evolution", Vehicular Technology Conference, 2009. VTC Spring 2009, Apr. 29, 2009.
Office Action on corresponding foreign application (TW 100118411) from TIPO dated Jan. 3, 2014.
3GPP TSG RAN WG2 Meeting #71, Aug. 23-27, 2010, Madrid, Spain.
Search Report on corresponding EP Patent Application No. 13183132.3.1 dated Oct. 2, 2013.

* cited by examiner

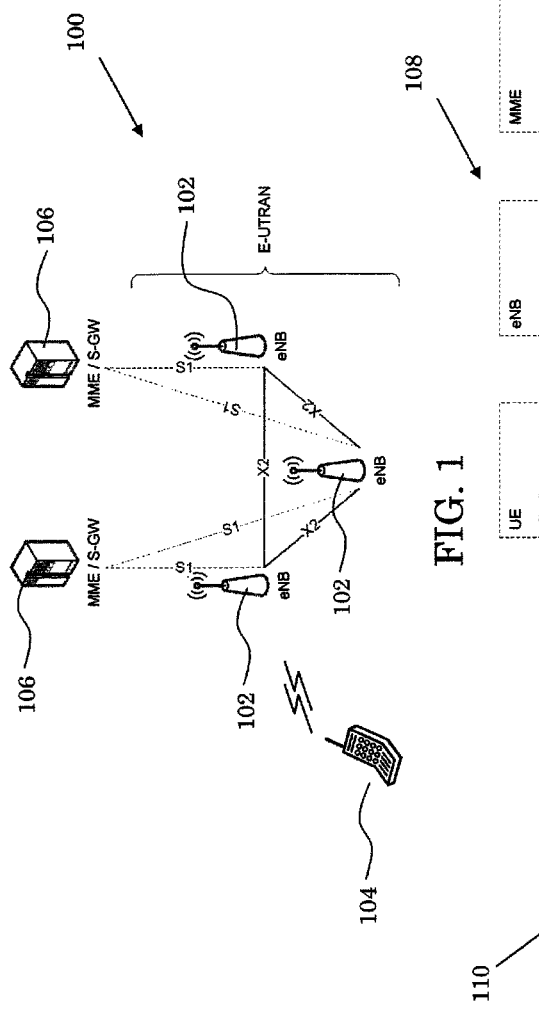
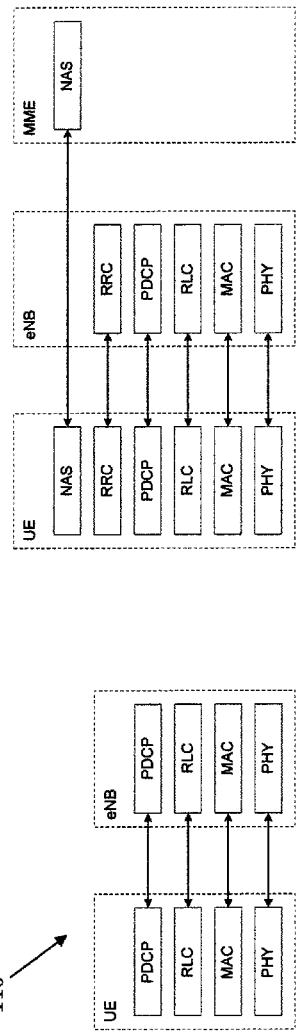
FIG. 1
FIG. 3
FIG. 2

METHOD AND APPARATUS FOR HANDLING BUFFER STATUS REPORTING IN A WIRELESS COMMUNICATION SYSTEM

CROSS-REFERENCE TO RELATED APPLICATIONS

The present Application claims the benefit of U.S. Provisional Patent Application Ser. No. 61/348,247, filed on May 26, 2010, the entire disclosure of which is incorporated herein by reference.

FIELD

This disclosure generally relates to wireless communication networks, and more particularly, to a method and apparatus for handling buffer status reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to one aspect, a method of handling buffer status reporting in a wireless communication system includes providing a first buffer size level table having a first maximum buffer size value, providing a second buffer size level table having a second maximum buffer size value greater than the first maximum buffer size value; and using the second buffer size level table when carrier aggregation (CA) is configured with more than one uplink (UL) component carrier (CC) or when more than one UL CC is activated.

According to another aspect, a method of handling buffer status reporting in a wireless communication system includes providing a first buffer size level table having a first maximum buffer size value, providing a second buffer size level table having a second maximum buffer size value greater than the first maximum buffer size value, and using an indication in one of a Radio Resource Control (RRC) message, a Medium Access Control (MAC) Control Element or a corresponding subheader of the MAC Control Element to indicate whether to use the second buffer size level table or the first buffer size level table.

According to another aspect, a communication device for use in a wireless communication system include a control circuit, a processor installed in the control circuit for executing a program code to command the control circuit, and a memory installed in the control circuit and coupled to the processor, the memory having stored therein a first buffer size level table having a first maximum buffer size value and a second buffer size level table having a second maximum buffer size value greater than the first maximum buffer size value. The processor is configured to execute a program code stored in memory to use the second buffer size level table when carrier aggregation (CA) is configured with more than one UL component carrier (CC), or when more than one UL CC is activated.

According to another aspect, a communication device for use in a wireless communication system includes a control circuit, a processor installed in the control circuit for executing a program code to command the control circuit, and a memory installed in the control circuit and coupled to the processor, the memory having stored therein a first buffer size level table having a first maximum buffer size value and a second buffer size level table having a second maximum buffer size value greater than the first maximum buffer size value. The processor is configured to execute a program code stored in memory to use an indication in one of a RRC message, a MAC Control Element or a corresponding subheader of the MAC Control Element to indicate whether to use the second buffer size level table or the first buffer size level table.

BRIEF DESCRIPTION OF THE DRAWINGS

FIG. 1 shows a diagram of a wireless communication system according to one exemplary embodiment.

FIG. 2 shows a user plane protocol stack of the wireless communication system of FIG. 1 according, to one exemplary embodiment.

FIG. 3 shows a control plane protocol stack of the wireless communication system of FIG. 1 according to one exemplary embodiment.

DETAILED DESCRIPTION

Figure 4:
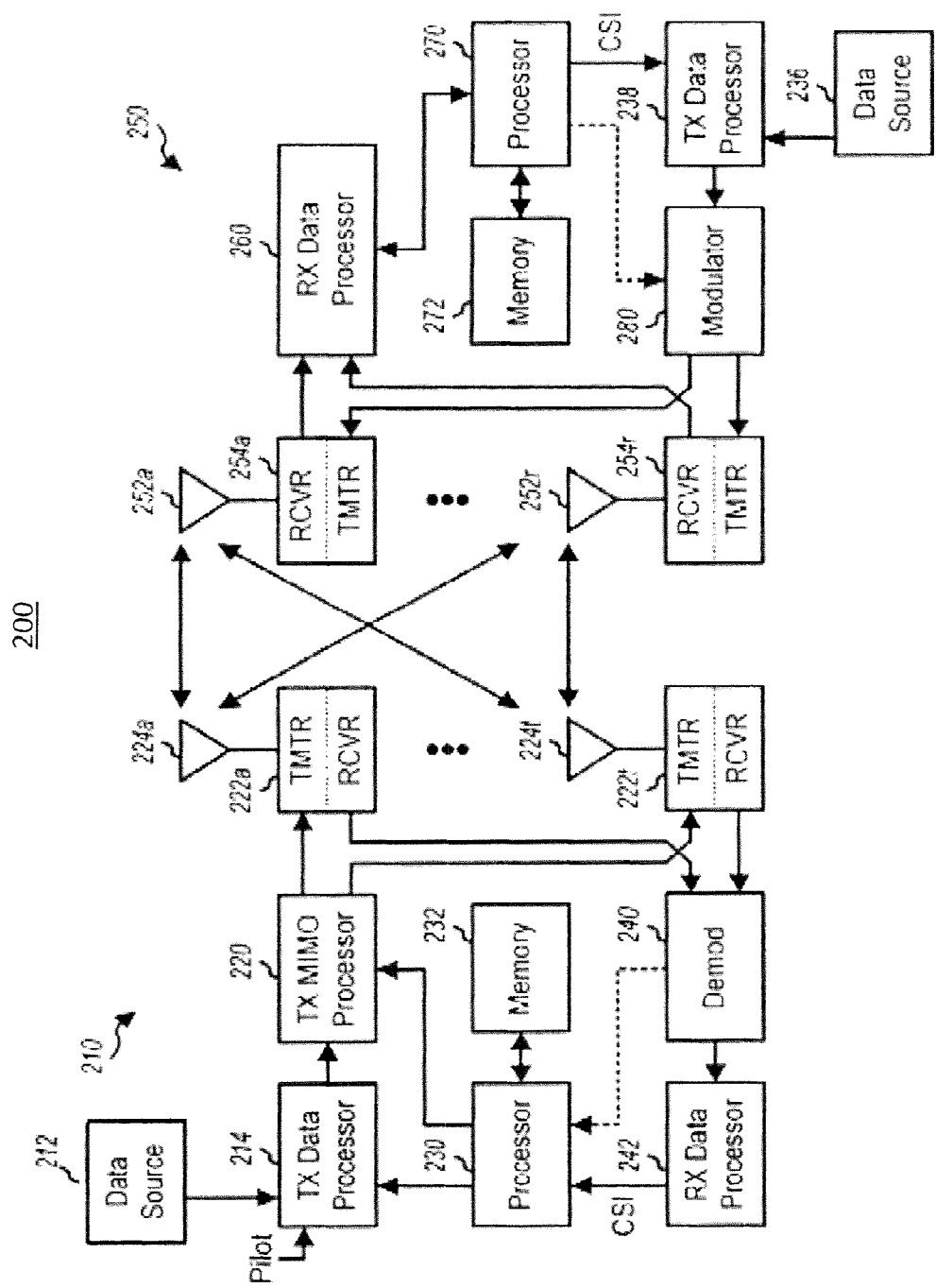
FIG. 4 is a block diagram of a transmitter system (also known as access network) and a receiver system (also known as user equipment or UE) according to one exemplary embodiment.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced), 3GPP2 UMB (Ultra Mobile Broadband), WiMax, or some other modulation techniques.

In particular. The exemplary wireless communication systems devices described below may be designed to support one or more standards such as the standard offered by a consortium named "3rd Generation Partnership Project" referred to herein as 3GPP, including Document Nos. 3GPP TS 36.331, V.9.2.0 ("Evolved Universal Terrestrial Radio Access (E-UTRA); Radio Resource Control (RRC) protocol specification (Release 9)"); and 3GPP TS 36.321. V.9.2.0 ("Evolved Universal Terrestrial Radio Access (E-UTRA); Medium Access Control (MAC) protocol specification (Release 9)"). The standards and documents listed above are hereby expressly incorporated herein.

An exemplary network structure of an Evolved Universal Terrestrial Radio Access Network (E-UTRAN) 100 as a mobile communication system is shown in FIG. 1 according to one exemplary embodiment. The E-UTRAN system can also be referred to as a LTE (Long-Term Evolution) system or LTE-A (Long-Term Evolution Advanced). The E-UTRAN generally includes eNode B or eNB 102, which function similar to a base station in a mobile voice communication network. Each eNB is connected by X2 interfaces. The eNBs are connected to terminals or user equipment (UE) 104 through a radio interface, and are connected to Mobility Management Entities (MME) or Serving Gateway (S-GW) 106 through S1 interfaces.

Referring to FIGS. 2 and 3, the LTE system is divided into control plane 108 protocol stack (shown in FIG. 3) and user plane 110 protocol stack (shown in FIG. 2) according to one exemplary embodiment. The control plane performs a function of exchanging a control signal between a UE and an eNB and the user plane performs a function of transmitting user data between the UE and the eNB. Referring to FIGS. 2 and 3, both the control plane and the user plane include a Packet Data Convergence Protocol (PDCP) layer, a Radio Link Control (RLC) layer, a Medium Access Control (MAC) layer and a physical (PHY) layer. The control plane additionally includes a Radio Resource Control (RRC) layer. The control plane also includes a Network Access Stratum (NAS) layer, which performs among other things including Evolved Packet System (EPS) bearer management, authentication, and security control.

The PHY layer provides information transmission service using a radio transmission technology and corresponds to a first layer of an open system interconnection (OSI) layer. The PHY layer is connected to the MAC layer through a transport channel. Data exchange between the MAC layer and the PHY layer is performed through the transport channel. The transport channel is defined by a scheme through which specific data are processed in the PHY layer.

The MAC layer performs the function of sending data transmitted from a RLC layer through a logical channel to the PHY layer through a proper transport channel and further performs the function of sending data transmitted from the PHY layer through a transport channel to the RLC layer through a proper logical channel. Further, the MAC layer inserts additional information into data received through the logical channel, analyzes the inserted additional information from data received through the transport channel to perform a proper operation and controls a random access operation.

The MAC layer and the RLC layer are connected to each other through a logical channel. The RLC layer controls the setting and release of a logical channel and may operate in one of an acknowledged mode (AM) operation mode, an unacknowledged mode (UM) operation mode and a transparent mode (TM) operation mode. Generally, the RLC layer divides Service Data Unit (SDU) sent from an upper layer at a proper size and vice versa. Further, the RLC layer takes charge of an error correction function through an automatic retransmission request (ARQ).

The PDCP layer is disposed above the RLC layer and performs a header compression unction of data transmitted in an IP packet form and a function of transmitting data without loss even when a Radio Network Controller (RNC) providing a service changes due to the movement of a UE.

The RRC layer is only defined in the control plane. The RRC layer controls logical channels, transport channels and physical channels in relation to establishment, re-configuration and release of Radio Bearers (RBs). Here, the RB signifies a service provided by the second layer of an OSI layer for data transmissions between the terminal and the E-UTRAN. If an RRC connection is established between the RRC layer of a UE and the RRC layer of the radio network, the UE is in the RRC connected mode. Otherwise, the UE is in an RRC idle mode.

FIG. 4 is a simplified block diagram of an exemplary embodiment of a transmitter system 210 (also known as the access network) and a receiver system 250 (also known as access terminal or UE in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g. BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 230. Processor 230 then determines which pre-coding matrix to use for determining the beamforming weights then processes the extracted message.

Figure 5:
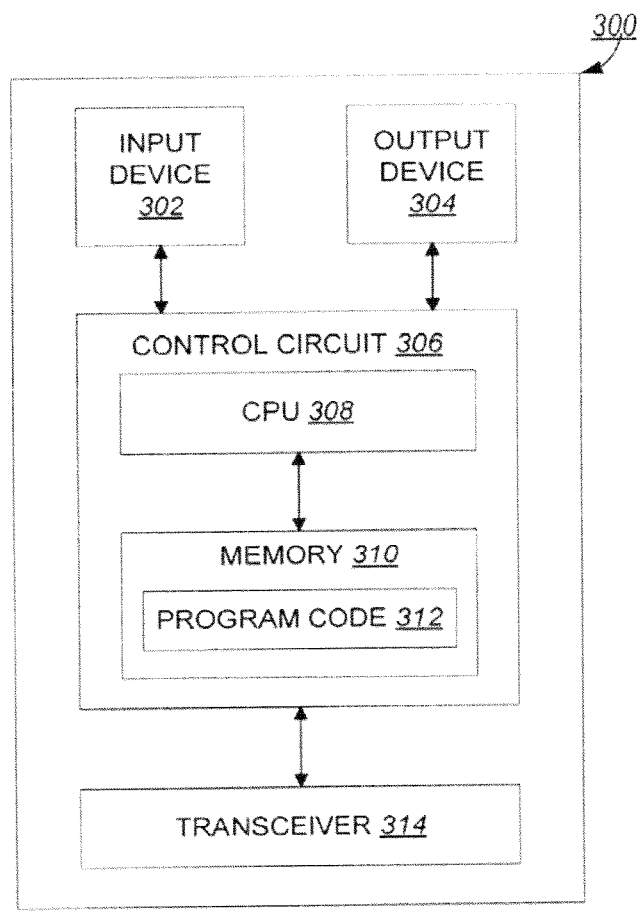
FIG. 5 is a functional block diagram of a UE according to one exemplary embodiment.

Turning to FIG. 5, this figure shows an alternative simplified functional block diagram of a communication device according to one exemplary embodiment. The communication device 300 in a wireless communication system can be utilized for realizing the UE 104 in FIG. 1, and the wireless communications system is preferably the LTE system, the LTE-A system or the like. The communication device 300 may include an input device 302, an output device 304, a control circuit 306, a central processing unit (CPU) 308, a memory 310, a program code 312, and a transceiver 314. The program code 312 includes the application layers and the layers of the control plane 108 and layers of user plane 110 as discussed above except the PHY layer. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

In a buffer status reporting procedure, the UE uses a MAC Protocol Data Unit (PDU) to carry a Buffer Status Report (BSR) MAC Control Element, so as to report information about the amount of data available in the UpLink (UL) buffers to the network. Accordingly, the network can determine the total amount of data available across one or all logical channel groups. BSR MAC Control Elements can be categorized into two formats: short and long. A short-format BSR control element is 1-byte long, and has 8 bits. The first 2 bits identify the Logic Channel Group ID (LCG ID) which buffer status is being reported, and a buffer size (BS) field is composed of the remaining six bits indicating the buffer size or the amount of data available across the logic channel group. A long-format BSR control element which includes four BS fields is three-bytes long, and is utilized for reporting the amount of data of the UL buffers of all the logic channel groups. Detailed description of the two formats can be found in related protocol specifications, and not narrated herein.

The value of the buffer size (BS) field in the BSR control element is taken from a buffer size level table in 3GPP TS 36.321, V.9.2.0 ("Evolved Universal Terrestrial Radio Access (E-UTRA); Medium Access Control (MAC) protocol specification (Release 9)"). The value of the buffer size field in the BSR control element is based on an index ranging from 0-63, which according to the buffer size level table, correspond to different buffer size value ranges, For example, index 0 corresponds to BS=0 byte, index 25 corresponds to 367<BS<=440 bytes, and index 50 correspond to 19325<BS<=22624 bytes. According to LTE protocol specifications, the buffer size level table is only able to indicate a buffer size of up to 150 Kbytes, i.e. index 62 corresponds to 128125<BS<=150000 bytes, or to indicate that the buffer size is more than 150 Kbytes, i.e. index 63 corresponds to BS>150000 bytes. Accordingly, the 150 Kbyte buffer size is the maximum value in the buffer size level table such that no indexed buffer size ranges are provided above the maximum value.

In LTE-Advanced (LTE-A), a UE with Carrier Aggregation (CA) can simultaneously receive and/or transmit on multiple component carriers (CCs). As a result, the maximum buffer size level for BSR may be many times greater than the maximum buffer size level provided in the buffer size level table according to LTE protocol specifications. Accordingly, regardless of how much data has arrived in the UE buffer, the UE can only specify in the BSR that its buffer size is at least 150 kBytes. Therefore, the buffer size level table according to LTE specifications may limit the throughput unless the eNB sacrifices efficiency by accepting over-allocation, which can result in excessive padding.

To allow the UE to specify larger buffer sizes in the BSR than the maximum buffer size provided by the buffer size level table (referred to hereinafter as the old buffer size level table), an additional or new buffer size level table may be provided for use with higher data rates. It is proposed in 3GPP TSG-RAN WG2 R2-102805 ("BSR for Carrier Aggregation") that the new buffer size level table is used when the feature, e.g. CA or UL MIMO is configured. The UE can choose which buffer size level table to use according to current buffer status and indicate to the eNB which table is used. The new buffer size level table may have larger granularity, while the old buffer size level table can provide the eNB with a more precise buffer status. For example, the new buffer size level table may have a maximum buffer size of 500 Kbytes, with each indexed buffer size range covering a larger range as compared to the indexed buffer size ranges of the old buffer size level table. However, one drawback of the alternative proposed by R2-102805 is that some scarce reserved values, e.g. reserved Logical Channel ID (LCID) values, or reserved fields, e.g. R bits, in a MAC PDU carrying a BSR MAC Control Element have to be used to indicate which table is used. Besides, the new buffer size level table may not always be needed in certain situations even if the UE is configured with CA. For Example, the new buffer size level table may not be needed if CA is configured due to a burst of downlink (DL) traffic or when aggregated UL CCs are with small bandwidth. If the UE uses the new buffer size level table when it is not needed, the eNB cannot acquire precise UE buffer status and UL radio resources may be wasted. Therefore, another alternative to specify proper timing of using the new buffer size level table is needed and of course, the timing shall be synchronized between eNB and UE.

Figure 6:
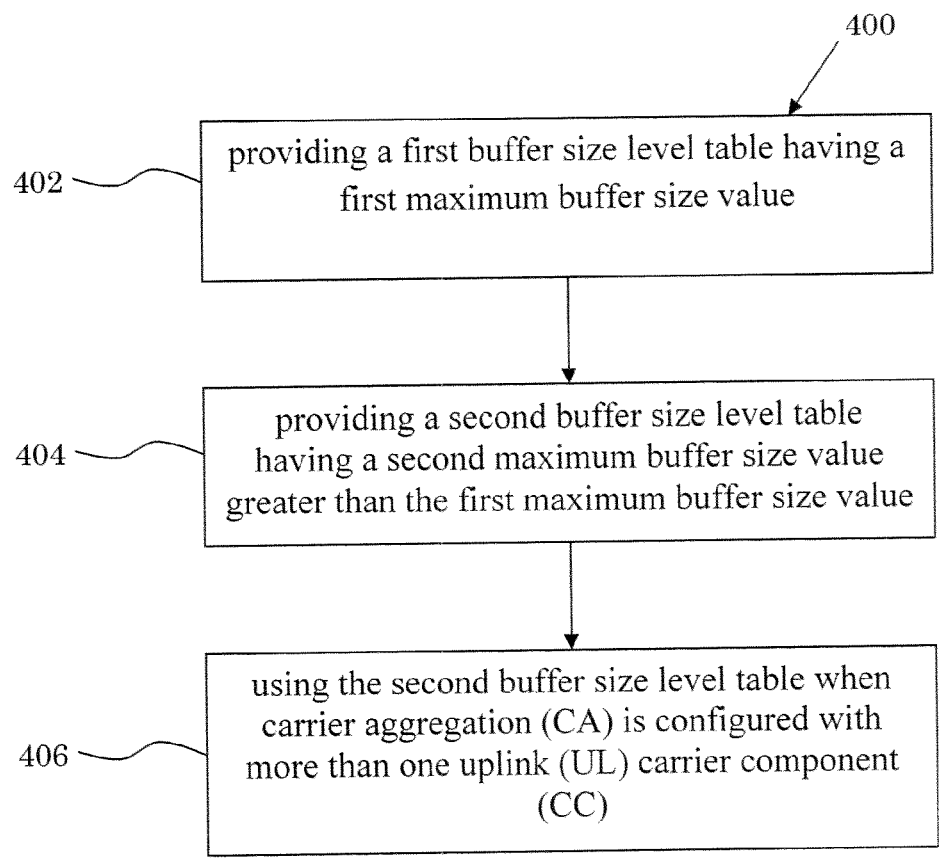
FIG. 6 shows a method of handling buffer status reporting in a wireless communication system according to an embodiment.

According to an embodiment shown in FIG. 6, a method 400 of handling buffer status reporting for a UE includes providing a first buffer size level table at 402 having a first maximum buffer size value and providing a second buffer size level table at 404 having a second maximum buffer size value greater than the first maximum buffer size value. The method then includes at 406 using the second buffer size level table when CA is configured with more than one UL CC. However, when the UE is configured with only one UL CC (UL CC of Primary Cell (PCell)), the second buffer size level table may not be used. Additionally, when only one UL CC is configured and UL multiple-input and multiple-output (MIMO) is not configured, the second buffer size level table may not be used. Referring to FIG. 5, the method 400 may be performed by the CPU 308 of the UE 300 executing one or more program codes 312 stored in the memory 310.

Figure 7:
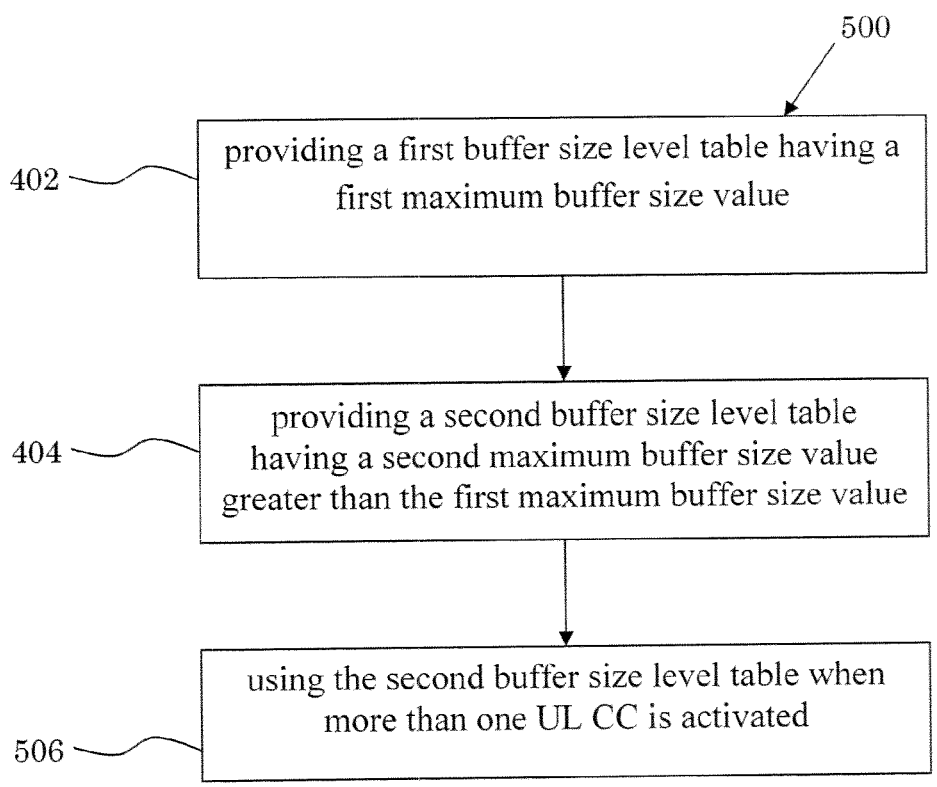
FIG. 7 shows a method of handling buffer status reporting in a wireless communication system according to another embodiment.

According to another embodiment shown in FIG. 7, a method 500 of handling buffer status reporting for a UE is shown, which similar to the embodiment of FIG. 6, includes providing a first buffer size level table at 402 having a first maximum buffer size value and providing a second buffer size level table at 404 having a second maximum buffer size value greater than the first maximum buffer size value. The method then includes at 506 using the second buffer size level table when more than one UL CC is activated. The UL CCs may include UL CC of PCell and a UL CC of Secondary Cell (SCell). The UL CC is activated by a MAC Control Element. The second buffer size level table may not be used when only one UL CC (UL CC of PCell) is activated. Additionally, the second buffer size level table may not be used when only one UL CC is activated and UL MIMO is not configured. Referring to FIG. 5, the method 500 may be performed by the CPU 308 of the UE 300 executing one or more program codes 312 stored in the memory 310.

Figure 8:
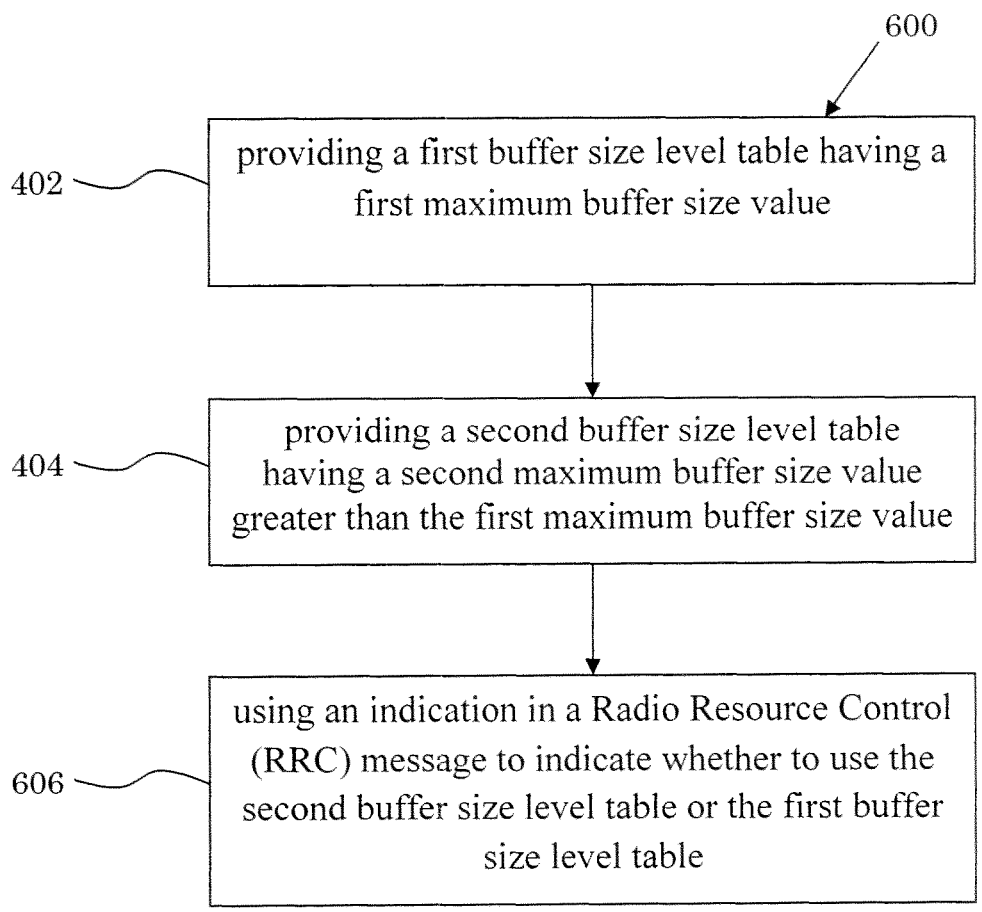
FIG. 8 shows a method of handling status reporting a wireless communication system according to another embodiment.

According to another embodiment shown in FIG. 8, a method 600 of handling buffer status reporting for a UE is shown, which similar to the embodiment of FIG. 6, includes providing a first buffer size level table at 402 having a first maximum buffer size value and providing a second buffer size level table at 404 having a second maximum buffer size value greater than the first maximum buffer size value. The method then includes at 606 using an indication in a RRC message to indicate whether the second buffer size level table should be used or to indicate which buffer size level table should be used. The RRC message is also used to configure or reconfigure CA. Also, the RRC message is used to configure or reconfigure UL MIMO. The RRC message may be a RRC-ConnectionReconfiguration message. The RRC message may be used to enable UL MIMO or enable CA. Referring to FIG. 5, all of the above operations of the method 600 may be performed by the CPU 308 of the UE 300 executing one or more program codes 312 stored in the memory 310.

Figure 9:
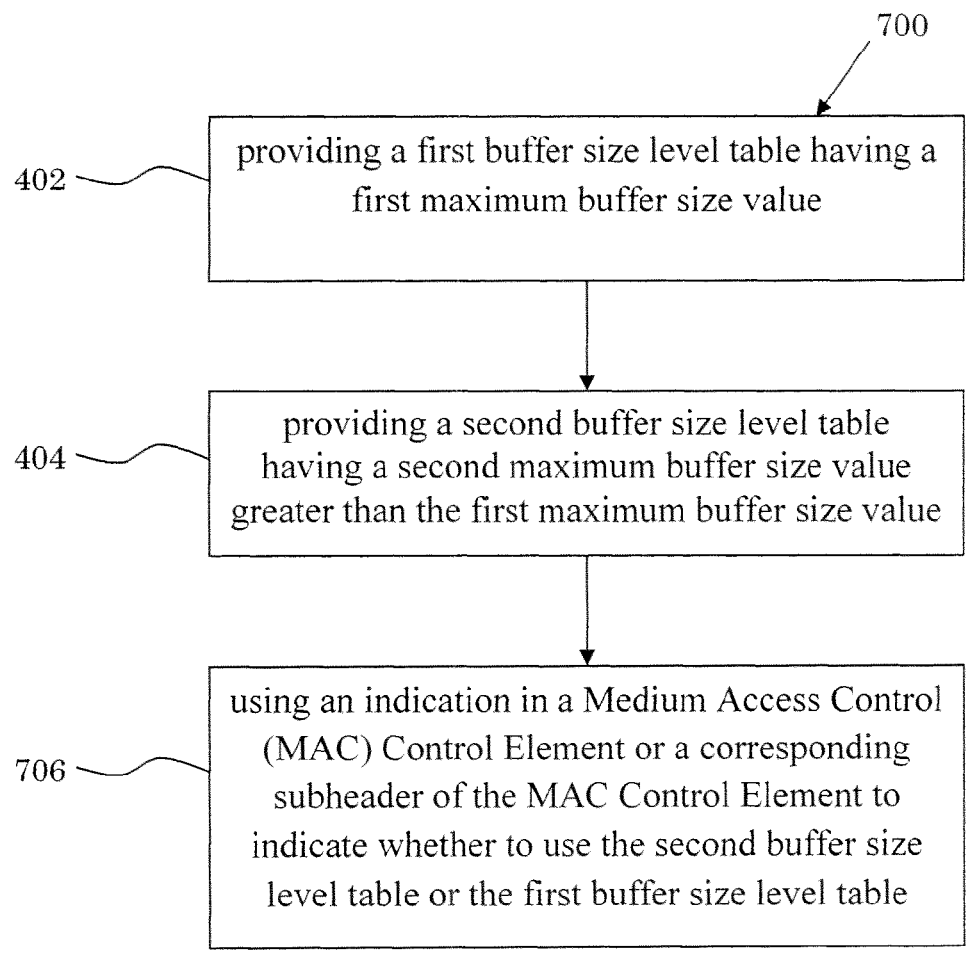
FIG. 9 shows a method of handling buffer status reporting in a wireless communication system according to another embodiment.

According to another embodiment shown in FIG. 9, a method 700 of handling buffer status reporting for a UE is shown, which similar to the embodiment of FIG. 6, includes providing a first buffer size level table at 402 having a first maximum buffer size value and providing a second buffer size level table at 404 having a second maximum buffer size value greater than the first maximum buffer size value. The method then includes at 706 using an indication in a MAC Control Element or the MAC Control Element's corresponding subheader to indicate whether the second buffer size level table can be used or to indicate which buffer size level table should be used. The MAC Control Element is transmitted in DL. The MAC control element is also used to activate and/or deactivate CC. Referring to FIG. 5, the method 700 may be performed by the CPU 308 of the UE 300 executing one or more program codes 312 stored in the memory 310.

Generally, in all of the above embodiments, when the second buffer size level table can be used, the first buffer size level table should not be used. In contrast, when the first buffer size level table can be used, the second buffer size level table can also be used instead of the first buffer size level table. However, the second buffer size level table may provide larger granularity, thereby providing a less precise BSR to the serving eNB and wasting of UL radio resources. Accordingly, the second buffer size level table should not be used when the first buffer size level table can be used.

In the embodiments above, the first buffer size level table may have a maximum buffer size value of 150 Kbytes according to LTE protocol specifications (i.e., the buffer size level table used in LTE), and the second buffer size level table may have a maximum buffer size value that is greater than 150 Kbytes. In one embodiment, the second buffer size level table has a greater granularity than the first buffer size level table. However, any granularity for the second buffer size level table is possible. The noted maximum buffer size values for the first and second buffer size level tables described herein, however, are exemplary and these values can be set to any level to provide a preferred operation. For example, the maximum buffer size value for the second buffer size level table may be 500 Kbytes. Similar to the first buffer size level table, any buffer size above the maximum value of the second buffer size level table may be reported as being above the maximum value without specifying a particular value or buffer size range. According to the embodiments shown in FIG. 8 and FIG. 9, whether to use the new buffer size level table is not coupled to CA or UL MIMO. Compared with the alternative proposed in R2-102805, the embodiments of FIGS. 8 and 9 provide more flexibility to let network to control which table should be used. Furthermore, according to various embodiments, when the second buffer size level table is used, throughput may not be limited and over-allocation by the eNB can be prevented in order to avoid excessive padding. Furthermore, the UE can use the second buffer size level table when it is needed so as to prevent UL radio resources from being wasted.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of handling buffer status reporting for a User Equipment (UE) in a wireless communication system, the method comprising:
   receiving an indication in a Radio Resource Control (RRC) Connection Reconfiguration message transmitted from an Evolved Universal Terrestrial Radio Access Network (E-UTRAN) to the UE to indicate whether a second buffer size level table should be used; and
   using, by the UE, a first buffer size level table or the second buffer size level table to decide a value of a buffer size field in a Buffer Status Report (BSR) Medium Access Control (MAC) Control Element based on the indication in order for the UE to report information about amount of data available in uplink (UL) buffer to the E-UTRAN;
   wherein the first buffer size level table having a first maximum buffer size value and the second buffer size level table having a second maximum buffer size value that is greater than the first maximum buffer size value.

2. The method of claim 1, wherein the RRC Connection Reconfiguration message is used to configure carrier aggregation (CA), or to reconfigure CA.

3. The method of claim 1, wherein the RRC Connection Reconfiguration message is used to enable CA.

4. The method of claim 1, wherein the RRC Connection Reconfiguration message is used to configure UL multiple-input and multiple-output (MIMO), or to reconfigure UL MIMO.

5. The method of claim 1, wherein the RRC Connection Reconfiguration message is used to enable UL MIMO.

6. The method of claim 1, wherein when the second buffer size level table is used, the first buffer size level table is not used.

7. A communication device of handling buffer status reporting in a wireless communication system, the communication device comprising:
   a control circuit;
   a processor installed in the control circuit for executing a program code to command the control circuit; and
   a memory installed in the control circuit and coupled to the processor, the memory having stored therein a first buffer size level table having a first maximum buffer size value and a second buffer size level table having a second maximum buffer size value greater than the first maximum buffer size value;
   wherein the processor is configured to execute the program code stored in the memory to receive an indication in a Radio Resource Control (RRC) Connection Reconfiguration message transmitted from an Evolved Universal Terrestrial Radio Access Network (E-UTRAN) to a UE (User Equipment) to indicate whether the second buffer size level table should be used, and to use the first buffer size level table or the second buffer size level table to decide a value of a buffer size field in a Buffer Status Report (BSR) Medium Access Control (MAC) Control Element based on the indication in order for the UE to report information about amount of data available in uplink (UL) buffer to the E-UTRAN.

8. The communication device of claim 7, wherein the RRC Connection Reconfiguration message is used to configure carrier aggregation (CA), or to reconfigure CA.

9. The communication device of claim 7, wherein the RRC Connection Reconfiguration message is used to enable CA.

10. The communication device of claim 7, wherein the RRC Connection Reconfiguration message is used to configure UL multiple-input and multiple-output (MIMO), or to reconfigure UL MIMO.

11. The communication device of claim 7, wherein the RRC Connection Reconfiguration message is used to enable UL MIMO.

12. The communication device of claim 7, wherein when the second buffer size level table is used, the first buffer size level table is not used.

13. A method of handling buffer status reporting in a wireless communication system, the method comprising:
transmitting an indication in a Radio Resource Control (RRC) Connection Reconfiguration message from an Evolved Universal Terrestrial Radio Access Network (E-UTRAN) to a User Equipment (UE) to indicate whether a first second buffer size level table or a second buffer size level table should be used by the UE to decide a value of a buffer size field in a Buffer Status Report (BSR) Medium Access Control (MAC) Control Element in order for the UE to report information about amount of data available in uplink (UL) buffer to the E-UTRAN;
wherein the first buffer size level table having a first maximum buffer size value and the second buffer size level table having a second maximum buffer size value that is greater than the first maximum buffer size value.

14. The method of claim 13, wherein the RRC Connection Reconfiguration message is used to configure carrier aggregation (CA), or to reconfigure CA.

15. The method of claim 13, wherein the RRC Connection Reconfiguration message is used to enable CA.

16. The method of claim 13, wherein the RRC Connection Reconfiguration message is used to configure UL multiple-input and multiple-output (MIMO), or to reconfigure UL MIMO.

17. The method of claim 13, wherein the RRC Connection Reconfiguration message is used to enable UL MIMO.

18. A communication device of handling buffer status reporting in a wireless communication system, the communication device comprising:
a control circuit;
a processor installed in the control circuit; and
a memory installed in the control circuit and coupled to the processor;
wherein the processor is configured to execute a program code stored in the memory to enable the communication device to:
transmit an indication in a Radio Resource Control (RRC) Connection Reconfiguration message from an Evolved Universal Terrestrial Radio Access Network (E-UTRAN) to a User Equipment (UE) to indicate whether a first buffer size level table or a second buffer size level table should be used by the UE to decide a value of a buffer size field in a Buffer Status Report (BSR) Medium Access Control (MAC) Control Element in order for the UE to report information about amount of data available in uplink (UL) buffer to the E-UTRAN;
wherein the first buffer size level table having a first maximum buffer size value and the second buffer size level table having a second maximum buffer size value that is greater than the first maximum buffer size value.

19. The communication device of claim 18, wherein the RRC Connection Reconfiguration message is used to configure carrier aggregation (CA), or to reconfigure CA.

20. The communication device of claim 18, wherein the RRC Connection Reconfiguration message is used to enable CA.

21. The communication device of claim 18, wherein the RRC Connection Reconfiguration message is used to configure UL multiple-input and multiple-output (MIMO), or to reconfigure UL MIMO.

22. The communication device of claim 18, wherein the RRC Connection Reconfiguration message is used to enable UL MIMO.

* * * * *